(12) United States Patent
Heit et al.

(10) Patent No.: US 8,798,605 B2
(45) Date of Patent: Aug. 5, 2014

(54) SYSTEM AND METHOD FOR TRANSFERRING AN ONGOING COMMUNICATION FROM A WIRELESS HANDHELD TELEPHONY DEVICE

(75) Inventors: David Lloyd Heit, Waterloo (CA); Eric Martin Ritter, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 348 days.

(21) Appl. No.: 12/818,642

(22) Filed: Jun. 18, 2010

(65) Prior Publication Data

US 2011/0177818 A1 Jul. 21, 2011

Related U.S. Application Data

(60) Provisional application No. 61/297,014, filed on Jan. 21, 2010.

(51) Int. Cl.
*H04M 3/42* (2006.01)

(52) U.S. Cl.
USPC ........ 455/417; 455/414.1; 455/418; 455/420; 379/212.01

(58) Field of Classification Search
USPC .............. 455/414.1–420; 379/211.01–212.01
See application file for complete search history.

(56) References Cited

U.S. PATENT DOCUMENTS

| | | | |
|---|---|---|---|
| 6,999,769 B1 | 2/2006 | Henon | |
| 7,092,385 B2 * | 8/2006 | Gallant et al. | 370/352 |
| 7,171,221 B1 | 1/2007 | Amin et al. | |
| 7,424,289 B2 | 9/2008 | Levien et al. | |
| 7,664,490 B2 * | 2/2010 | Aaby et al. | 455/416 |
| 2003/0073431 A1 | 4/2003 | Dorenbosch | |
| 2003/0112956 A1 * | 6/2003 | Brown et al. | 379/221.01 |
| 2006/0072591 A1 | 4/2006 | Rogalski et al. | |
| 2006/0246882 A1 * | 11/2006 | Frank et al. | 455/417 |
| 2007/0274292 A1 | 11/2007 | Schneider et al. | |
| 2009/0131026 A1 * | 5/2009 | Allen et al. | 455/417 |
| 2009/0296913 A1 * | 12/2009 | Thomas et al. | 379/211.02 |
| 2009/0316877 A1 | 12/2009 | Desai et al. | |
| 2011/0177801 A1 * | 7/2011 | Heit et al. | 455/417 |

FOREIGN PATENT DOCUMENTS

| | | | | |
|---|---|---|---|---|
| GB | 2452020 | * | 7/2007 | H04W 76/02 |
| GB | 2452020 A | | 2/2009 | |
| WO | 0143459 A2 | | 6/2001 | |
| WO | 0143459 A3 | | 6/2001 | |
| WO | 2007050126 A1 | | 5/2007 | |

OTHER PUBLICATIONS

Matias Erny Reichl Hoffmann, Response to extended European Search Report dated May 16, 2011, in respect of European Patent application No. 10166494.4.
European Patent Office, Partial European Search Report, dated Oct. 11, 2010.

(Continued)

*Primary Examiner* — Ronald Eisner
(74) *Attorney, Agent, or Firm* — Norton Rose Fulbright Canada LLP

(57) ABSTRACT

Devices, methods, and programmed instructions useful for transferring an end of an existing call session from a wireless handheld telephony device to a second device, such as a desk phone. The second device provides information useful for transferring the call directly to the handheld device on which the call session is established.

20 Claims, 12 Drawing Sheets

(56) References Cited

OTHER PUBLICATIONS

European Patent Office, Extended European Search Report for EP Application No. 10166494.4, dated Feb. 17, 2011, Germany.
Canadian Intellectual Property Office, Examiner's Requisition dated Oct. 15, 2012, issued in Canadian Patent Application No. 2,725,507.
Wikihow, How to Transfer Your Cellphone Book to Your Prius—wikiHow, URL: http://www.wikihow.com/Transfer-Your-Cellphone-Phone-Book-to-Your-Prius (last accessed on Jul. 5, 2010).
Norton Rose, Response to Examiners Requisition dated May 28, 2013, filed in Canadian Patent Application No. 2,725,514.
United States Patent and Trademark Office, Office Action dated Mar. 6, 2014, issued in U.S. Appl. No. 12/830,364.

* cited by examiner

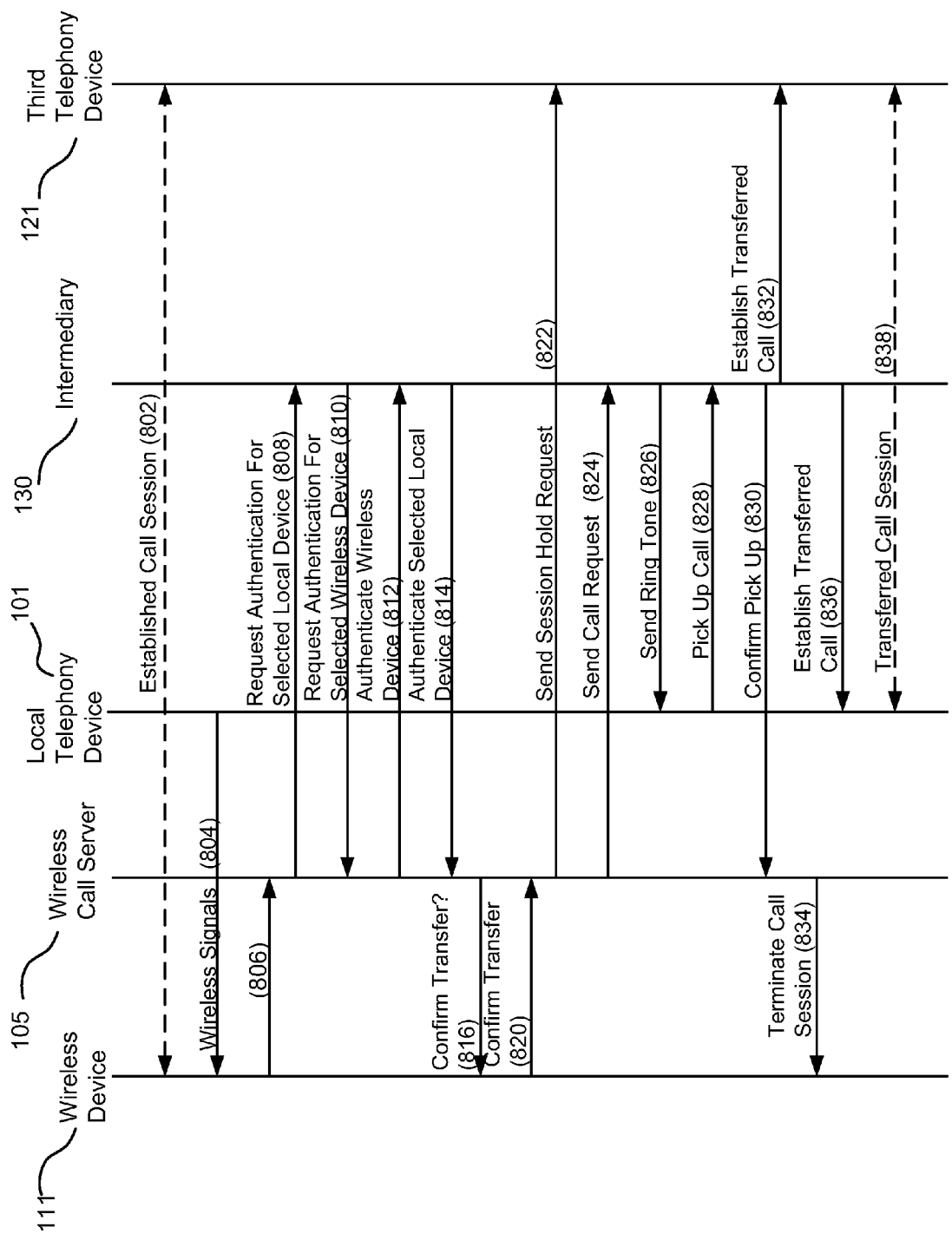

SYSTEM AND METHOD FOR TRANSFERRING AN ONGOING COMMUNICATION FROM A WIRELESS HANDHELD TELEPHONY DEVICE

CROSS-REFERENCE TO RELATED APPLICATIONS

The present disclosure claims priority from U.S. provisional patent application No. 61/297,014, filed Jan. 21, 2010, the entirety of which is hereby incorporated by reference.

FIELD

The present application relates to wireless handheld telephony devices and, more particularly, to systems and methods for transferring an end of an ongoing communication session from a first telephony device to a second telephony device.

BACKGROUND

There is a need for improved devices and methods for allowing a user of a telephony device, such as a wireless telephone, to transfer the user's end of a telephone call session from the telephony device on which the call session was established to a second telephony device, such as a desk telephone. The ability to make such transfers can, for example, improve the security of the call session (e.g., the security of the communications from eavesdroppers), the comfort of the user, the economics of the telephone call (such, for example, where a wireless telephone subscription disfavors extended wireless use) and other factors.

Some systems and devices for transferring calls from wireless to other telephony devices do exist. However, they tend to be less flexible, secure, dependable, and user friendly than they might be. There is need for improvement.

BRIEF DESCRIPTION OF THE DRAWINGS

Reference will now be made, by way of example, to the accompanying drawings which show example embodiments of subject matter disclosed herein, and in which:

FIG. 9 is a signaling diagram generally showing an example of a transfer of a communications session in accordance with the disclosure herein.

Similar reference numerals may have been used in different figures to denote similar components.

DESCRIPTION OF EXAMPLE EMBODIMENTS

Figure 1:
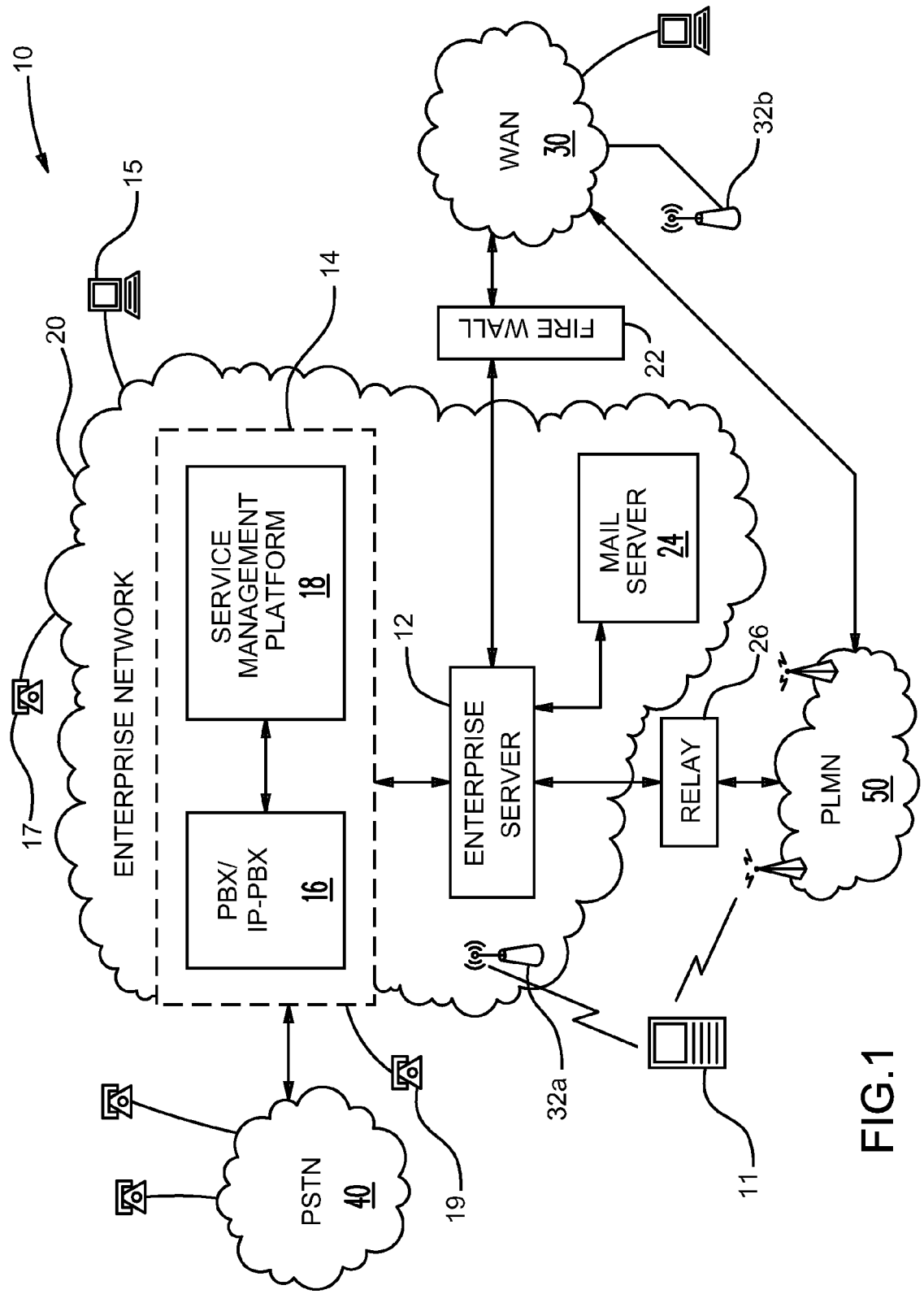
FIG. 1 shows a schematic diagram of an example system for managing telephone and other communications in accordance with the disclosure herein.

For example, in some aspects, the disclosure herein provides a wireless handheld telephony device comprising at least one wireless signal receiver, at least one wireless signal transmitter, at least one data processor, and media readable by the at least one data processor comprising coded program instructions adapted for enabling the wireless handheld telephony device adapted to cause transfer to a second telephony device of an end of a communications session previously established between the wireless handheld telephony device and at least one third telephony device. The wireless handheld telephony device can, for example, do so by: while the previously-established communications session between the wireless handheld telephony device and the at least one third telephony device is maintained, receiving direct from one or more target local telephony devices one or more wireless signals representing data useful for establishing communications between the one or more target local telephony device and a call server managing the end of the previously-established communications session associated with the wireless handheld telephony device; using the wireless signals received direct from the one or more target local telephony devices, instructing the call server to establish a communications session between a selected one of the one or more target local telephony devices and the at least one third telephony device; and upon establishment of a communications session between the selected target local telephony device and the at least one third telephony device, terminating the previously-established communications session between the wireless handheld telephony device and the at least one third telephony device.

In some other aspects, the disclosure provides a method of transferring to a second telephony device an end of a communications session previously established between a wireless handheld telephony device and at least one third telephony device, where the wireless handheld telephony device comprises at least one wireless signal receiver, at least one wireless signal transmitter, at least one data processor, and media readable by the at least one data processor comprising coded program instructions. Such methods can, for example, comprise: while maintaining the previously-established communications session between the wireless handheld telephony device and the at least one third telephony device, receiving direct from one or more target local telephony devices one or more wireless signals representing data useful for establishing communications between the one or more target local telephony devices and a call server managing the end of the previously-established communications session associated with the wireless handheld telephony device; using the wireless signals received direct from the one or more target local telephony devices, instructing the call server to establish a communications session between a selected one of the at least one target local telephony devices and the at least one third telephony device; and upon establishment of a communications session between the selected local telephony device and the at least one third telephony device, terminating the previously-established communications session between the wireless handheld telephony device and the at least one third telephony device.

Other aspects of the disclosure will be apparent to those of ordinary skill in the art from a review of the following detailed description in conjunction with the drawings.

Embodiments of the present application are not limited to any particular operating system, mobile device architecture, server architecture, or computer programming language.

The present application relates to the control and management of communications. Although reference may be made to "calls" in the description of example embodiments below, it will be appreciated that the described systems and methods are applicable to session-based communications in general and not limited to voice calls, and that references to "calls" are intended to refer to session-based communications sessions of any type, including voice, data or text communications, unless clearly indicated otherwise by context. It will also be appreciated that the systems and methods may not be limited to sessions and may be applicable to messaging-based communications in some embodiments.

Reference is now made to FIG. 1, which shows, in block diagram form, an example of a system, generally designated 10, for the control and management of communications, suitable for use in implementing the systems and methods disclosed herein. System 10 includes an enterprise or business communications system 20, which may include a local area network (LAN). In the description below, the enterprise or business system 20 may be referred to as an enterprise network 20. It will be appreciated that enterprise network 20 may include more than one network and may be located in multiple geographic areas in some embodiments.

Enterprise network 20 may be connected, for example through a firewall 22, to a wide area network (WAN) 30, such as the Internet. Enterprise network 20 may also be connected to a public switched telephone network (PSTN) 40 via direct inward dialing (DID) trunks or primary rate interface (PRI) trunks.

Enterprise network 20 may also communicate with a public land mobile network (PLMN) 50, which may also be referred to as a wireless wide area network (WWAN) or, in some cases, a cellular network. Connection with the PLMN 50 may be made via a relay 26, as known in the art.

Enterprise network 20 may also provide one or more wireless local area networks (WLANs) 32a featuring wireless access points. Other WLANs 32 may exist outside enterprise network 20. For example, WLAN 32b may be connected to WAN 30.

System 10 may include and/or interact with a number of enterprise-associated mobile devices 11 (only one shown). Mobile device(s) 11 may include devices equipped for cellular communication through the PLMN 50, mobile devices equipped for WI-FI® wireless communications over one of the WLANs 32, and/or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in for example any of a variety of known manners, as the user moves. In some instances, the dual-mode mobile devices 11 and/or enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

Enterprise network 20 typically includes a number of networked servers, computers, and other devices. For example, enterprise network 20 may connect one or more desktop or laptop computers 15 (one shown). The connection may be wired or wireless in some embodiments. Enterprise network 20 may also connect to one or more digital telephone sets 17 (one shown).

Enterprise network 20 may include one or more mail servers, such as mail server 24, for coordinating the transmission, storage, and receipt of electronic messages for client devices operating within enterprise network 20. Typical mail servers include the Microsoft Exchange Server™ and the IBM Lotus Domino™ server. Each user within the enterprise typically has at least one user account within enterprise network 20. Associated with each user account is message address information, such as an e-mail address. Messages addressed to a user message address are stored on enterprise network 20 in the mail server 24. The messages may be retrieved by the user using a messaging application, such as an e-mail client application. The messaging application may be operating on a user's computer 15 connected to enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from enterprise network 20 to the mobile device 11 via the PLMN 50.

In the embodiment shown, enterprise network 20 also includes an enterprise server 12. Together with the relay 26, the enterprise server 12 can function to redirect, copy, or relay incoming e-mail messages addressed to a user's e-mail address within enterprise network 20 to the user's mobile device 11 and to relay incoming e-mail messages composed and sent via the mobile device 11 out to the intended recipients within the WAN 30 and/or elsewhere. Among other functions, enterprise server 12 and relay 26 together can facilitate "push" e-mail service for the mobile device 11 enabling the user to send and receive e-mail messages using the mobile device 11 as though the user were connected to an e-mail client within enterprise network 20 using the user's enterprise-related e-mail address, for example on computer 15.

As is typical in many enterprises, enterprise network 20 can include one or more Private Branch eXchanges (although in various embodiments the PBX(s) may be standard PBX(s) or IP-PBX(s), for simplicity the description below uses the term PBX to refer to both) 16 having a connection with the PSTN 40 for routing incoming and outgoing voice calls to and from digital and/or analog telephones or other telephony devices for the enterprise. PBX 16 is connected to the PSTN 40 via DID trunks or PRI trunks, for example. PBX 16 may use ISDN signaling protocols for setting up and tearing down circuit-switched connections through the PSTN 40 and related signaling and communications. In some embodiments, PBX 16 may be connected to one or more conventional analog telephones 19. PBX 16 may also be connected to enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from PBX 16 to the PSTN 40 or incoming from the PSTN 40 to PBX 16 are typically circuit-switched calls. Within the enterprise, e.g. between PBX 16 and terminal devices, voice calls are often packet-switched calls, for example Voice-over-IP (VoIP) calls.

Enterprise network 20 may include a Service Management Platform (SMP) 18 for performing aspects of messaging or session control, such as call control and advanced call processing features. SMP 18 may, in some cases, also perform some media handling. Collectively SMP 18 and PBX 16 may be referred to as the enterprise communications platform, generally designated 14. It will be appreciated that the enterprise communications platform 14 and, in particular, SMP 18, is implemented on one or more servers having suitable communications interfaces for connecting to and communicating with PBX 16 and/or DID/PRI trunks. Although SMP 18 may be implemented on a stand-alone server, it will be appreciated that it may be implemented into an existing control agent/server as a logical software component. As will be described below, SMP 18 may be implemented as a multi-layer platform.

For devices such as telephony devices 11, 19 controlled by or otherwise associated with it, enterprise communications platform 14 can implement switching to connect session legs and may provide conversion between, for example, a circuit-switched call and a VoIP call, or connect legs of other media sessions. Such calls/sessions may be set up and modified on behalf of devices 11, 19 and any desired telephony devices, within or outside enterprise network 20, including for example devices 19, 107 connected to PSTN 40. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the capabilities of enterprise communications platform 14 is to extend the features of enterprise telephony to mobile device(s) 11. For example, enterprise communications platform 14 may allow mobile device(s) 11 to perform functions akin to those normally available on a standard office telephone, such as the digital telephone set 17 or analog telephone set 15. Example features may include direct extension dialing, enterprise voice mail, conferencing, call transfer, call park, etc. As further described elsewhere herein, enterprise communications platform 14 can further provide functions such as transfer of corresponding ends of existing communications sessions from one or more mobile devices 11 to wired telephony devices 19 associated with platform 14.

Figure 2:
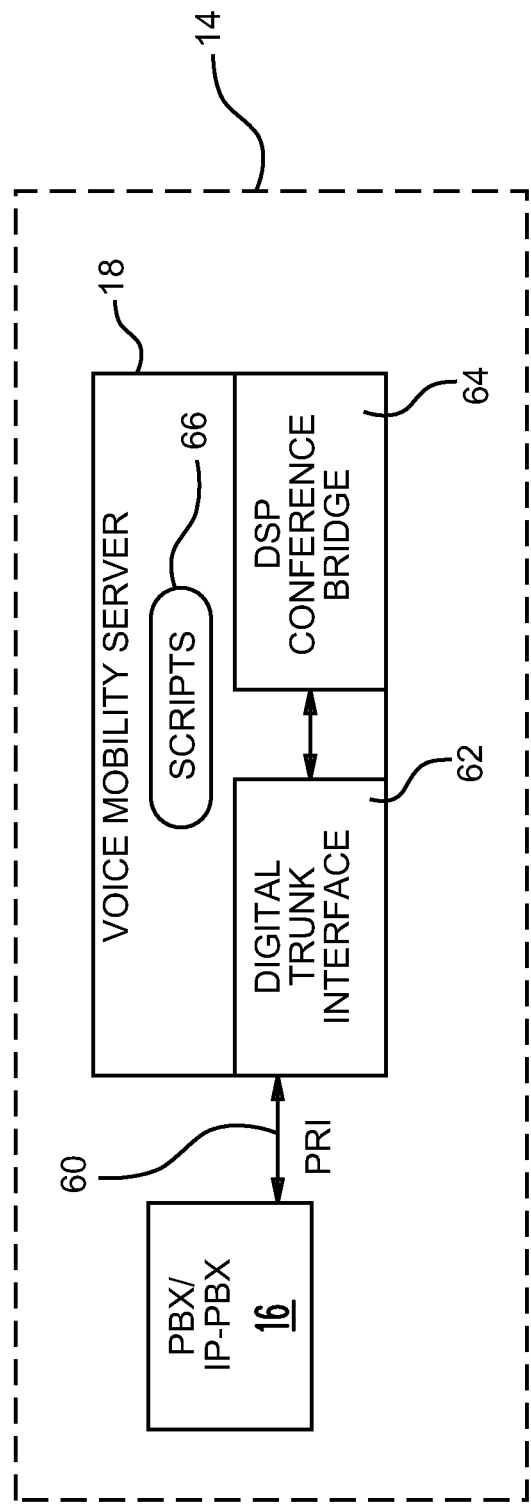
FIGS. 2-5 show schematic diagrams of example embodiments of details of a system such as that shown in FIG. 1.
Figure 3:
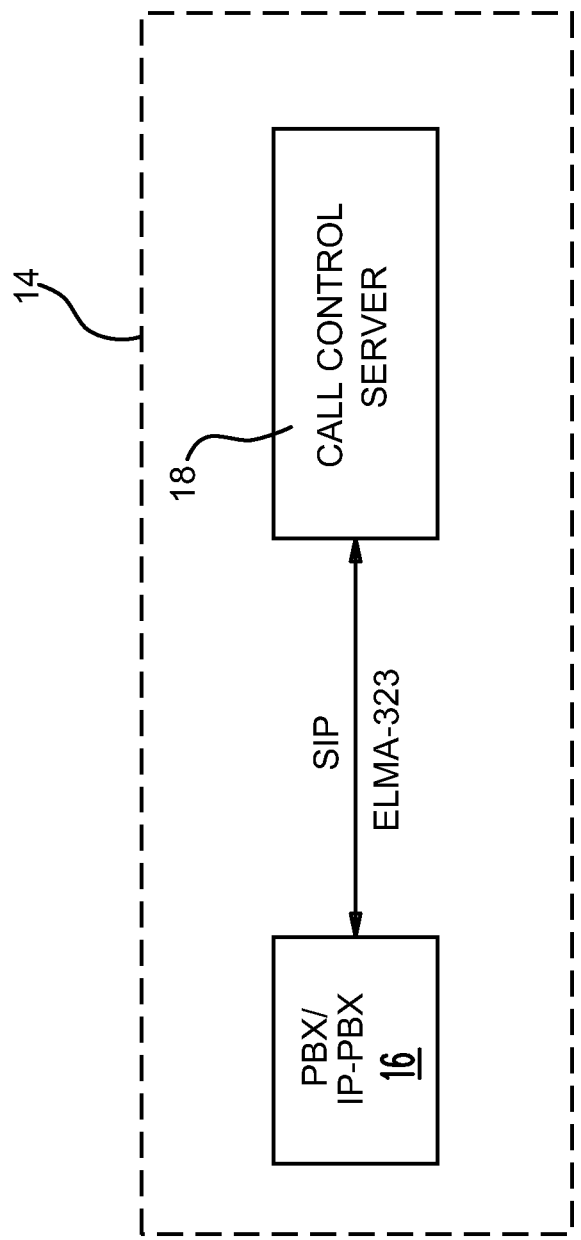
Figure 4:
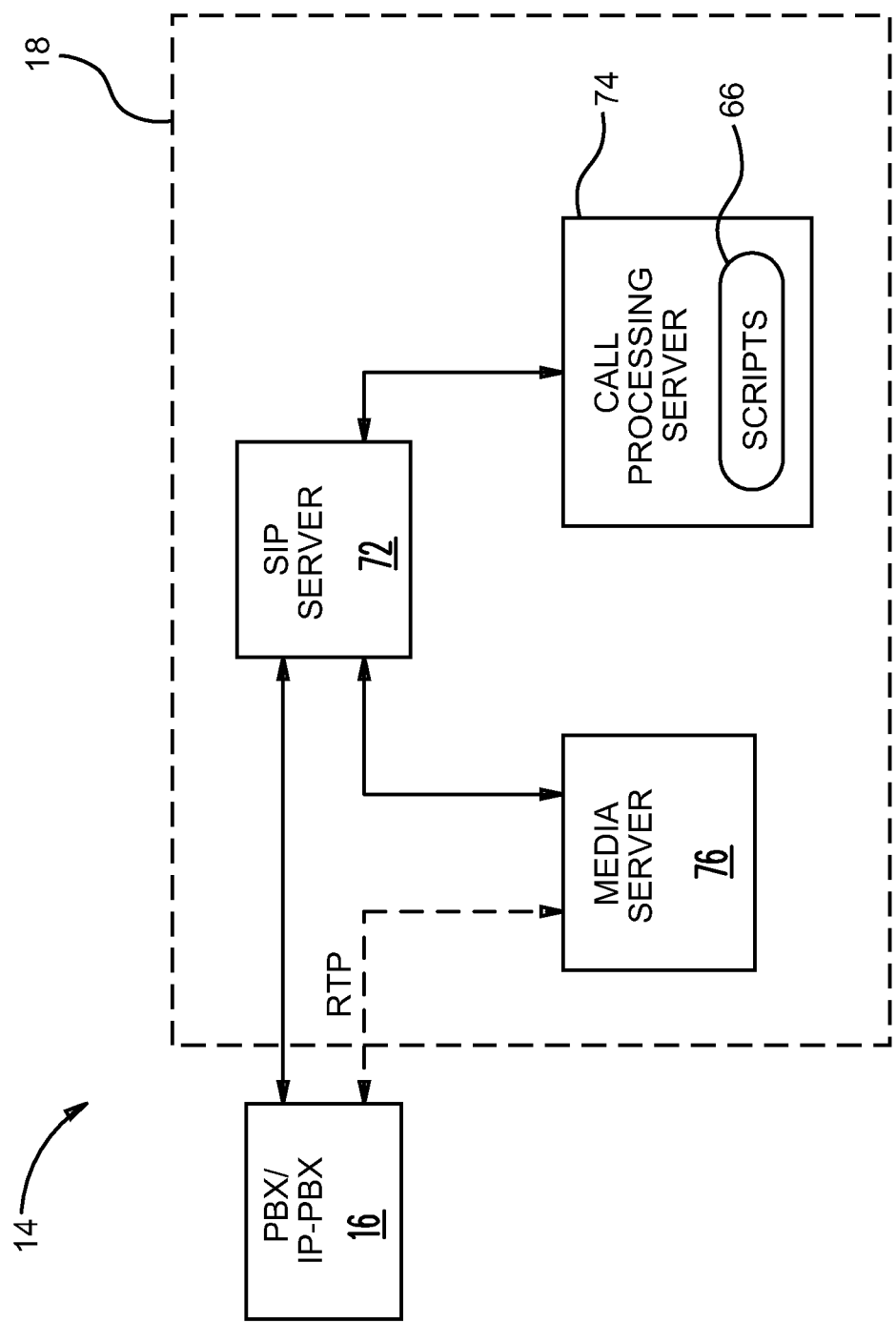

Reference is now made to FIGS. 2 to 4, which show example embodiments of enterprise communications system 14. Again, although references are made below to "calls" or call-centric features it will be appreciated that the architectures and systems depicted and described are applicable to session-based (e.g., voice) communications in general and, in some instances, to text, image, or other messaging-based communications.

FIG. 2 illustrates an embodiment intended for use in a circuit-switched TDM context. PBX 16 is coupled to SMP 18 via PRI connection 60 or other suitable digital trunk. In some embodiments, PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between PBX 16 and SMP 18.

In this embodiment, SMP 18 assumes control over both call processing and the media itself. This architecture may be referred to as "First Party Call Control". Many of the media handling functions normally implemented by PBX 16 are handled by SMP 18 in this architecture. Incoming calls addressed to any extension or direct dial number within the enterprise, for example, are always first routed to SMP 18. Thereafter, a call leg is established from SMP 18 to the called party within the enterprise, and the two legs are bridged. Accordingly, SMP 18 includes a digital trunk interface 62 and a digital signal processing (DSP) conferencing bridge 64. DSP conferencing bridge 64 performs the bridging of calls for implementation of various call features, such as conferencing, call transfer, etc. Digital trunk interface 62 may be implemented as a plurality of telephonic cards, e.g. Intel Dialogic cards, interconnected by a bus and operating under the control of a processor. Digital trunk interface 62 may also be partly implemented using a processor module such as, for example, a Host Media Processing (HMP) processor.

SMP 18 may include various scripts 66 for managing call processing. Scripts 66 are implemented as software modules, routines, functions, etc., stored in non-volatile memory and executed by the processor of SMP 18. Scripts 66 may implement call flow logic, business logic, user preferences, call service processes, and various feature applications.

FIG. 3 shows another embodiment in which PBX 16 performs the functions of terminating and/or bridging media streams, but call control functions are largely handled by SMP 18. In this embodiment, SMP 18 may be referred to as a call control server 18. This architecture may be referred to as "Third-Party Call Control".

Call control server 18 is coupled to PBX 16, for example through the LAN, enabling packet-based communications and, more specifically, IP-based communications. In one embodiment, communications between PBX 16 and call control server 18 are carried out in accordance with SIP. In other words, call control server 18 uses SIP-based communications to manage the set up, tear down, and control of media handled by PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of enterprise communications system 14. This embodiment reflects the adaptation of an existing set of call processing scripts to an architecture that relies on third-party call control, with separate call control and media handling. SMP 18 includes a call processing server 74. The call processing server 74 includes the scripts or other programming constructs for performing call handling functions. SMP 18 also includes a SIP server 72 and a media server 76. The separate SIP server 72 and media server 76 logically separate the call control from media handling. SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

SIP server 72 interacts with the media server 76 using SIP-based media handling commands. For example, SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for enterprise communications system 14 will be appreciated by those ordinarily skilled in the art.

Figure 5A:
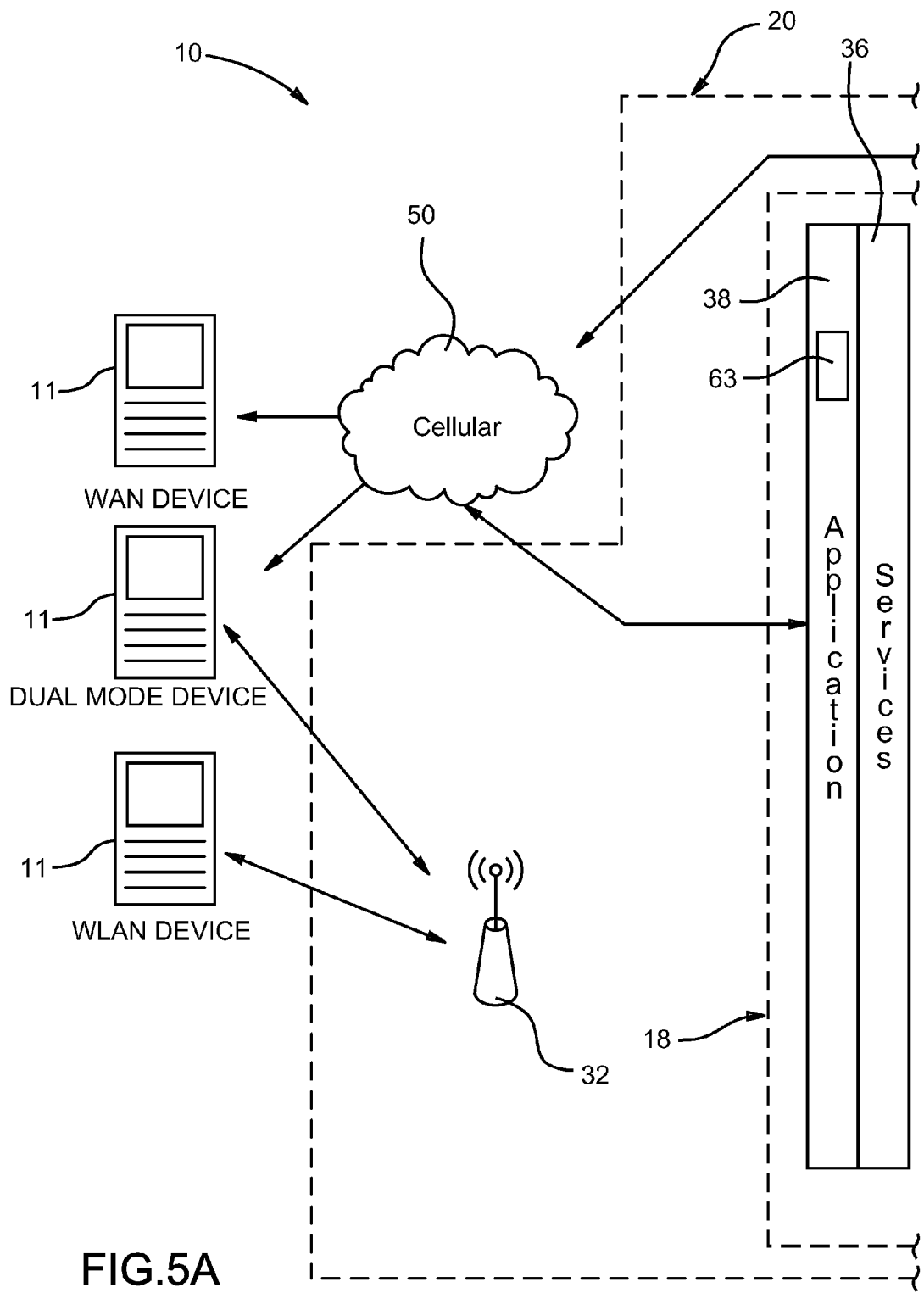
Figure 5B:
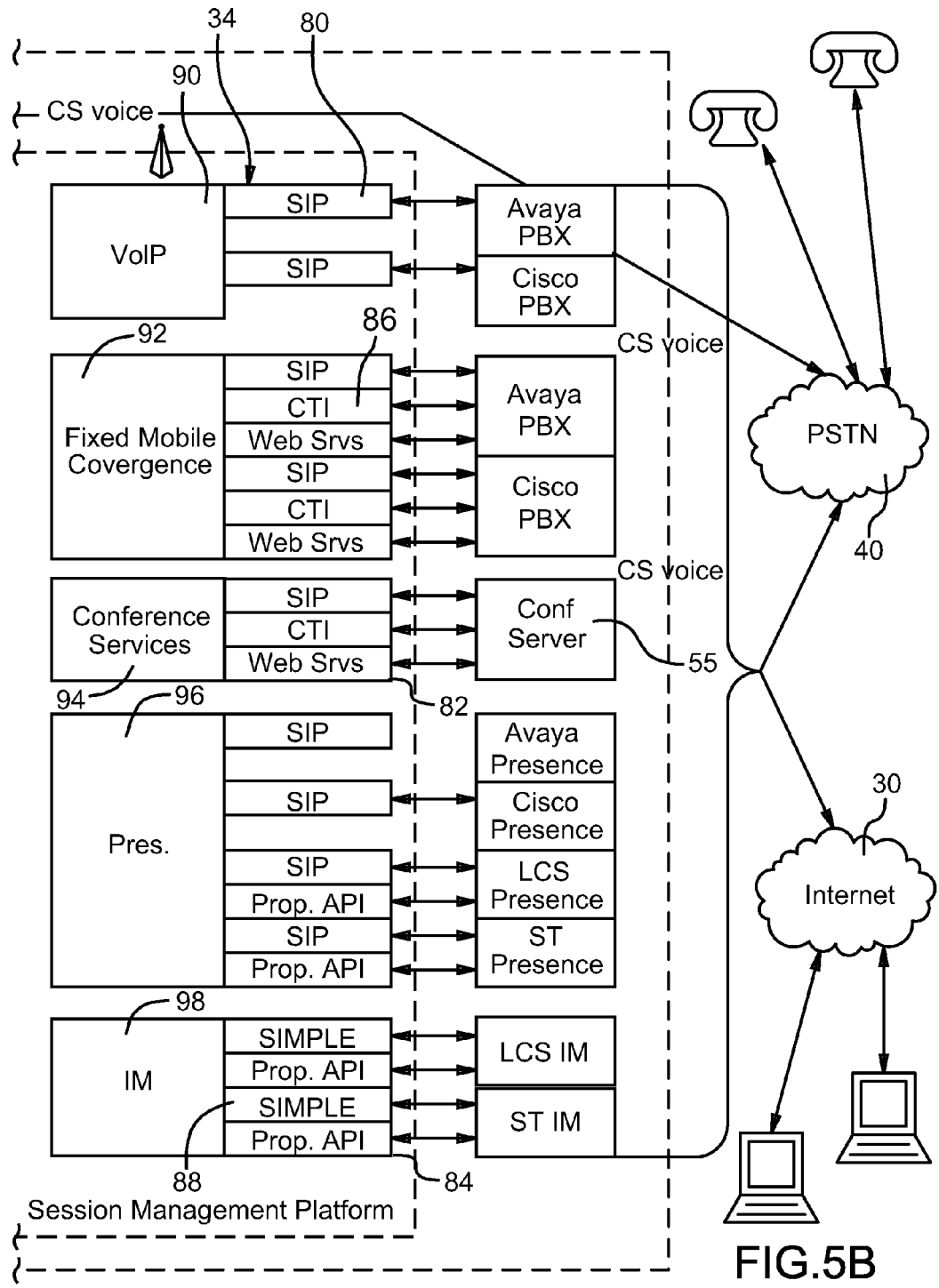

Reference is now made to FIG. 5, which shows an embodiment of enterprise communications system 14 with a Third Party Call Control architecture. In this embodiment, SMP 18 is a multi-layer platform that includes a protocol layer 34, a services layer 36 and an application layer 38. Protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, protocol layer 34 preferably includes protocols which allow media to be controlled separate from data. For example, protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in enterprise network 20, which will be further described below.

For the purposes of this disclosure, SIP 80 will be utilized, although it is appreciated that system 10 can operate using the above disclosed or any other suitable protocols. As known by those skilled in the relevant arts, SIP is the IETF (Internet Engineering Task Force) standard for multimedia session management, and more specifically is an application-layer control protocol for establishing, maintaining, modifying and terminating multimedia sessions between two or more endpoints. As further known by those skilled in the relevant arts, SIP protocol 80 includes two interfaces for signaling: SIP-Trunk (hereinafter referred to as "SIP-T") and SIP-Line (hereinafter referred to as "SIP-L"). Specifically, SIP-T interface is utilized when the endpoint is a non-specific entity or not registered (i.e., when communicating between two network entities). In contrast, SIP-L interface is utilized when the endpoint is registered (i.e., when dialing to a specific extension). The specific operation of system 10 utilizing SIP 80 will be described in further detail below.

SMP 18 also includes a plurality of enablers, among other things, a VoIP enabler 90, a Fixed Mobile Convergence or FMC enabler 92, a conference services/call and/or session transfer enabler 94, a presence enabler 96, and an Instant Messaging or IM enabler 98. Each of the enablers 90-98 can be used by corresponding services in the services layer 36 that combine one or more of the enablers. Each of the applications in the application layer 38 can then be combined with one or more of the services to perform the desired application. For example, a phone call service may use the VoIP or PBX enabler, and an emergency response application may use the phone call service, an Instant Messenger service, a video call service, and email service and/or a conference service.

Application layer 38 may include a conference services application 63 that, together with the conference services enabler 94, enables multiple communication devices (including desk telephones and personal computers) to participate in a conference call through use of a centralized conference server 55. As seen in FIG. 5, Conference server 55 is provided in enterprise network 20 and is in communication with the conference services enabler 94 preferably through SIP protocol 80, although it is recognized that additional protocols that control media separate from data may be appropriate, such as the Web Services protocol 82 or the CTI protocol 86. Conference call server 55 is configured for directing media and data streams to and from one or more communication devices (i.e., mobile devices 11, telephones 17, and computers 15).

Figure 6:
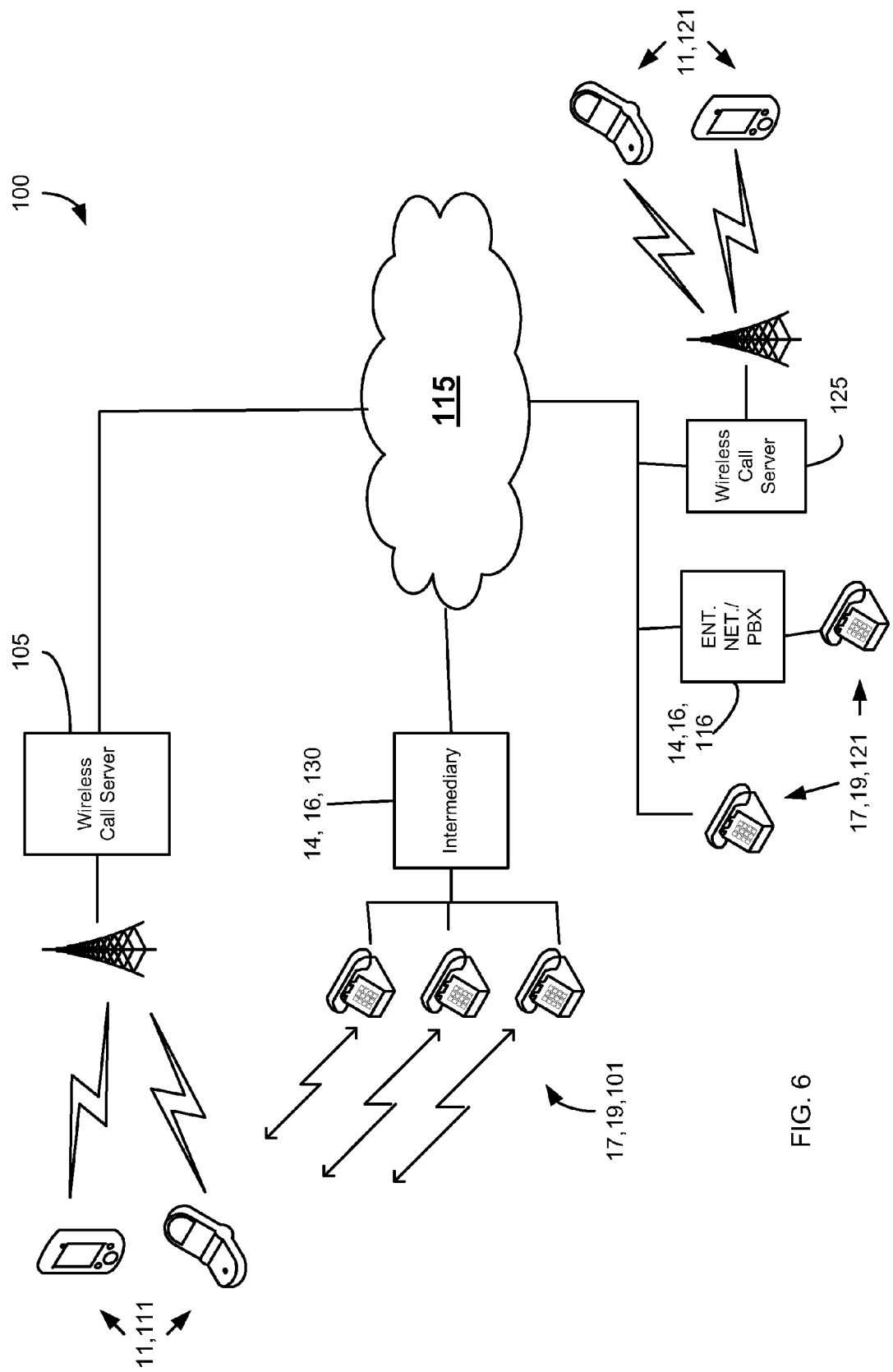
FIG. 6 shows a schematic diagram of an example system for managing telephone and other communications in accordance with the disclosure herein.

Reference is now made to FIG. 6, which shows, in block diagram form, an example system for transferring an end of a communication session from a wireless handheld telephony device 111 to a second telephony device 101 in accordance with the disclosure herein. The system comprises one or more wireless handheld telephony device(s) 111, any one or more of which may be engaged in established or ongoing communications with at least one third telephony device 121 through PSTN or other communication cloud or network 115, such as PSTN 40 or PLMN 50 of FIG. 1. In some embodiments, the system may be a hosted environment, such as a corporate or enterprise environment, or it may be a switching environment.

Communication cloud 115 may be adapted for carrying voice communications according, for example, to any of the several IP or non-IP protocols described above, or any other suitable protocols or methods. For example, in some embodiments, communication cloud 115 may comprise or otherwise interact with a PSTN 40 and/or PLMN 50. Communication cloud 115 may also be capable of carrying image, text, or other data. For example, communication cloud 115 may comprise a WAN 30, such as the Internet.

Wireless handheld telephony device(s) 111 may be any type of wireless handheld device with telephony capabilities including, but not limited to, cellular telephones, BlackBerry™ devices, PDAs and other devices described herein. Such wireless handheld telephony devices 111 can facilitate voice telephonic and/or other communications through, for example, wireless call server(s) 105. Call server(s) 105 can comprise any systems, processors, and/or other components suitable for use in implementing the systems and functions described herein. For example, call server(s) 105 can include any or all suitable components of enterprise network 20, including for example any or all of the components communications platform 14 and/or enterprise server 12. In some embodiments, communications between wireless handheld telephony devices 111 and at least one third telephony device 121 may be routed through a PBX 16 as, for example, described above in relation to FIG. 1.

It will be understood by those skilled in the relevant arts that PBX(s) 16 may comprise the service management platform 18 or enterprise communications system 14 described in relation to FIGS. 1-5; for simplicity, they are referred to herein simply as PBX(s) 16.

The at least one third telephony device 121 can include any type of telephony devices suitable for accomplishing the purposes described herein, including, but not limited to, landline or wired telephones, such as VoIP protocol or other digital telephone sets 17, analog telephone sets 15, and/or wireless telephony devices 11 accessible through, for example, wireless call servers 125. One or more of such third telephony devices 121 may also be enterprise telephones accessible through, for example, a PBX 116. PBX 116 may or may not be the same as PBX 16. Wireless call server 125 may or may not be the same as wireless call server 105.

As explained herein, a user of a wireless handheld telephony device 111 may, in various circumstances, wish to transfer the user's end of a previously-established communication session from the user's wireless handheld telephony device 111 to a second telephony device such as one of target local telephony devices 101. This may be desirable when, for example, the battery on wireless handheld telephony device 111 is low or the user does not wish to drain the battery further, when second telephony device 101 is considered more secure, when wireless audio quality or wireless signal is poor or when the user of wireless handheld telephony device 111 wishes to use some of the functionality available on second telephony device 101.

Target local telephony devices 101 may be enterprise telephony devices configured to communicate through an intermediary 130 comprising, for example, PBX 16. In other embodiments, target local telephony device 101 may be a public telephony device and may be configured to communicate through an intermediary 130 which may, for example, comprise a switching environment. Target local telephony devices 101 may be wired devices, or they may be connected to intermediary 130 wirelessly such as, for example, through a WI-FI® wireless connection. In some embodiments, target local telephony devices 101 may be configured to allow voice communications to be made over the Internet, such as a device equipped with Skype™ software.

As mentioned above, in some embodiments, intermediary 130 may comprise PBX 16. In other embodiments, intermediary 130 may comprise a switching environment. In some embodiments, intermediary 130 may form part of communication cloud 115.

Each of the one or more target local telephony devices 101 include functionality which will allow wireless handheld telephony device 111 to receive one or more wireless signals directly from the one or more target local telephony devices 101. Such signals can represent data useful for establishing communications between the one or more target local telephony devices 101 and wireless call server 105 which administers or is otherwise associated with wireless handheld telephony device 111.

In some embodiments, such wireless signals may be pushed from the one or more target local telephony devices 101 to any wireless handheld telephony device 111 within communications range of target local telephony device 101. For example, each target local telephony device 101 may include hardware, such as a radio or other wireless transmitter, capable of broadcasting such wireless signals. For example, target local telephony devices 101 may include BlueTooth™ capabilities. In such embodiments wireless handheld telephony device(s) 111 may be adapted to receive, interpret, and further process wireless signals broadcast by the one or more target local telephony devices 101 in accordance with this disclosure. In some embodiments, the wireless signals are transmitted by target local telephony device 101 only when the telephony device 101 is in an idle state (e.g. not in use for an active call session).

In other embodiments, such wireless signals may be pulled from target local telephony devices 101 by wireless handheld telephony device 111. For example, each target local telephony device 101 may include a radio-frequency identification (RFID) transponder configured to respond to an inquiry signal received wirelessly from a suitably-configured RFID transmitter associated with a wireless handheld telephony device 111 within range of target local telephony device 101.

Wireless signals provided by a particular target local telephony device 101 may be received by all wireless handheld telephony devices 111 within range of the local device, or they may be directed only to a particular user or group of users. For example, a user's desk phone may be configured to only send wireless signals to that user's wireless handheld telephony device 111 or to wireless handheld telephony device 111 of users within the same working group. Similarly, in some embodiments, a target local telephony device 101 may be configured not to transmit wireless signals to any wireless handheld telephony device 111.

Figure 7B:
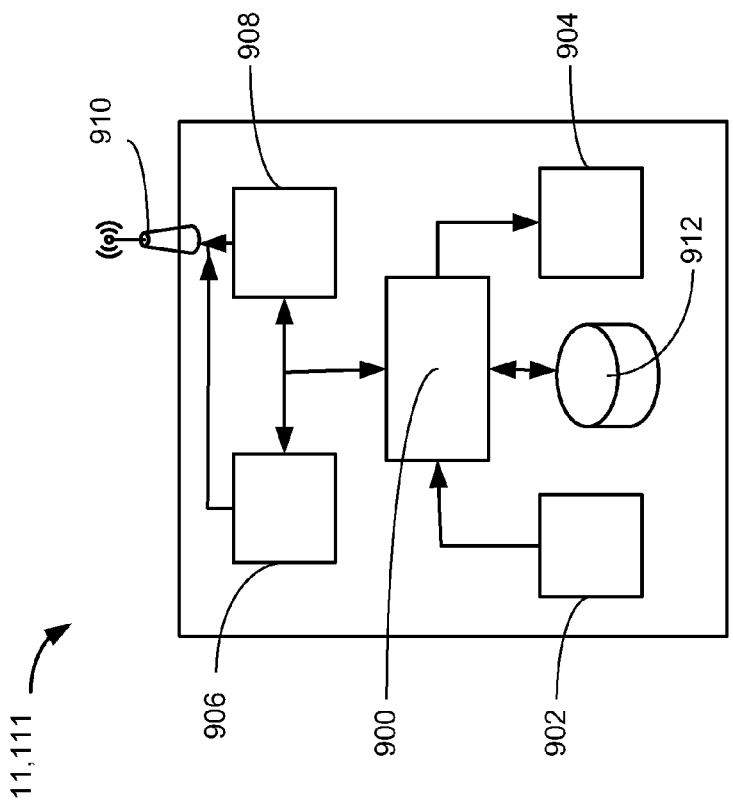
FIG. 7 provides schematic diagrams of wireless handheld telephony devices suitable for use in implementing the systems, devices, and methods disclosed herein.
Figure 7A:
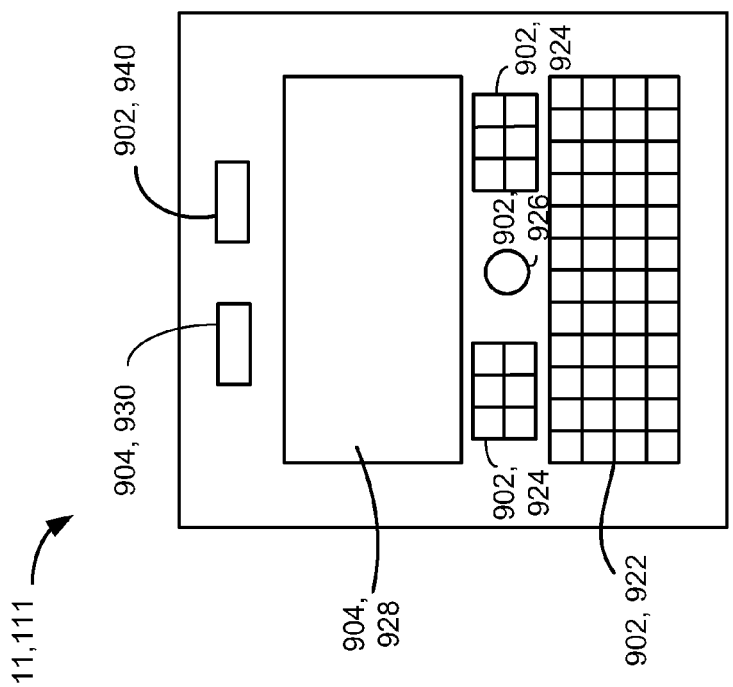

FIG. 7 provides schematic diagrams of wireless handheld telephony devices 11, 111 suitable for use in implementing the systems, devices and methods disclosed herein. FIG. 7a provides a schematic front view of a wireless handheld telephony device 11, 111, while FIG. 7b provides a functional block diagram of components suitable for use in configuring wireless handheld telephony device 11, 111 for the purposes disclosed herein.

In the example shown in FIG. 7a, wireless handheld telephony device 11, 111 comprises input means 902 and output means 904. Input means 902 can include devices such as keyboard(s) 922, function button(s)/switch(es) 924, microphone(s) 940, and pointing device(s) 926 such as a trackball, thumbwheel, etc. for providing single- or multi-stroke input for building and/or issuing command signals for use by processor(s) 900 as described herein. Input means 902 can be configured to provide various forms of input command signals to processor 900 of the handheld device, for local processing and or for output by the processor to one or more of memory(s) 912, output device(s) 904, and/or transmitter 906 for transmission to external devices such as wireless control server 105.

Output means 904 can include devices such as display(s) 928 and speaker(s) 930 for providing visual and audio outputs, respectively. As will be readily understood by those skilled in the relevant arts, input and output means or devices 902, 904, can be of any types and include any such means or devices suitable for use in accomplishing the purposes described herein. A wide variety of suitable means and devices are now known, and doubtless others will hereafter be developed. Output means 904 can be configured to process output signals provided by processor(s) 900 in response to internal processing as described herein, and/or as received from external sources such as wireless control server 105 via antenna 910 and receiver 908.

In the example shown in FIG. 7b, wireless handheld telephony device 11, 111 comprises one or more processors 900, input means 902, output means 904, wireless transmitter 906, wireless receiver 908, antenna(s) 910, and memory(s) 912. One or more processors 900, wireless transmitters 906, receivers 908, and antennas 910 can be provided for use in implementing digital and/or analog voice, data, and/or command signal and communications processes. For example, separate sets of antennas 910, receivers 908, transmitters 906, processors 900, and associated memories 912 can be provided for each of voice and data communications systems, and/or one or more of such components may be used for multiple types of communications using multiple protocols. As will be readily understood by those skilled in the relevant arts, and as described further herein, such processors, transmitters, receivers, antennas, and memories can be of any types and include means or devices suitable for use in accomplishing the purposes described herein. A wide variety of suitable means and devices are now known, and doubtless others will hereafter be developed.

Figure 8:
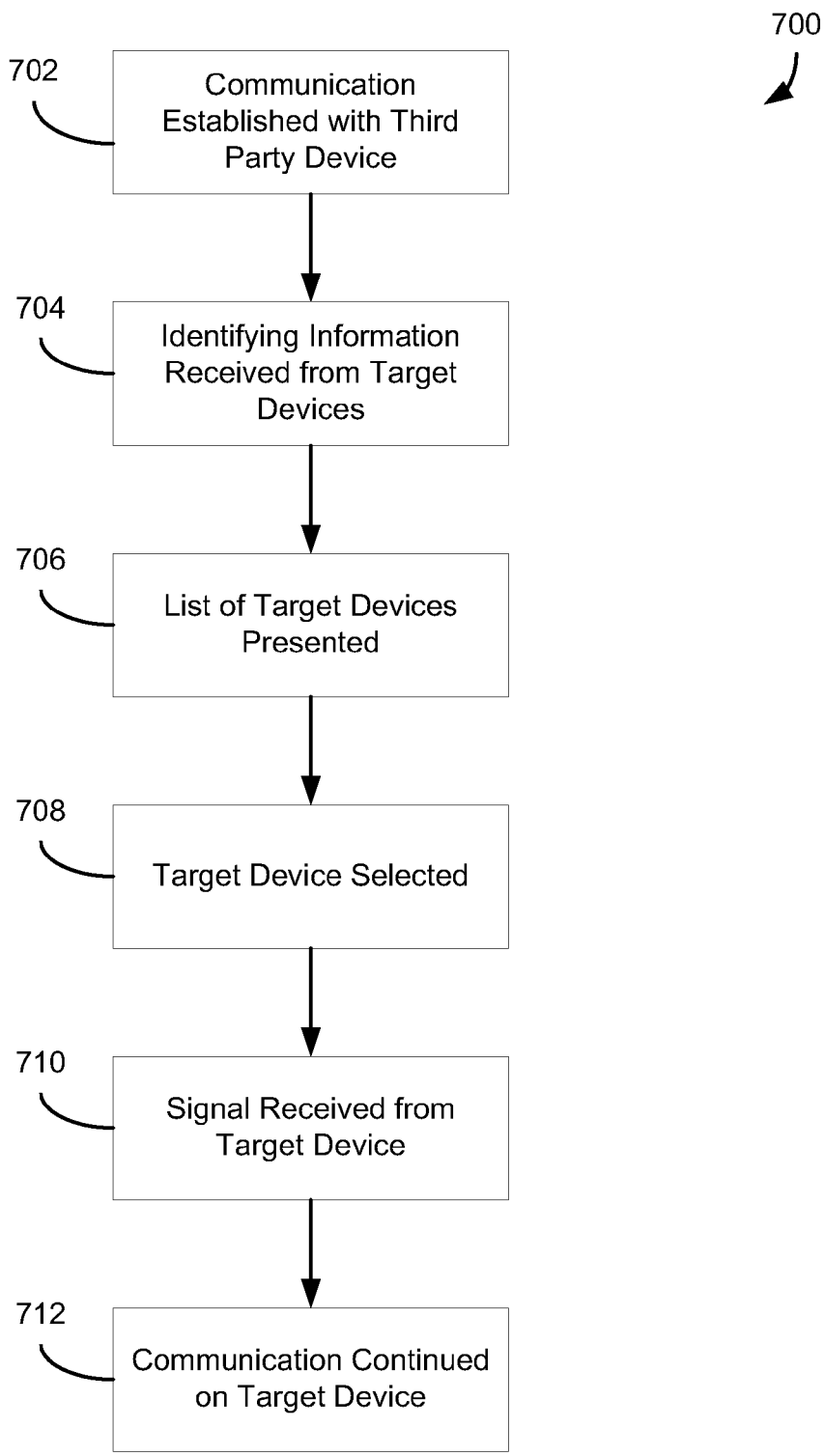
FIG. 8 shows a schematic flow diagram of an example of a method of transferring an ongoing communication in accordance with the disclosure herein.

Reference will now be made to FIG. 8, which shows a flow diagram representing an example of a method 700 for transferring an end of a communications session from a wireless handheld telephony device 111 to a second telephony device, the second telephony device being, for example one of target local telephony devices 101. Method 700 is suitable for use, for example, in conjunction with systems 10, 100 of FIGS. 1 and/or 6 and wireless handheld telephony devices 11, 111 of FIG. 7 in implementing the disclosure herein.

A method 700 can be considered to begin at block 702, where a communication session, such as a voice communication session, has been established between a wireless handheld telephony device 111 and at least one third telephony device 121 through PSTN 40, PLMN 50, or other communications cloud 115. Wireless handheld telephony device 111's end of the call session can be controlled by a wireless server 105.

At 704, wireless handheld telephony device 111 receives pulled or pushed wireless signals from one or more target local telephony devices 101. Such signals can represent, at least in part, data useful for establishing communications between one or more target local telephony devices 101 and its controlling wireless call server 105. Such wireless signals may for example comprise identifying information for each target local telephony device 101, or set of devices 101, such as, for example, extension numbers, telephone name(s) or other identifier(s), or office, cubicle, or other physical location. The wireless signals may also include directional information, such as global or relative coordinates, ranges, or compass directions. In some embodiments, the directional information may be useful in providing a directional display displayed on wireless handheld telephony device 111. Such signals may also include data useable by a wireless call server 105 controlling wireless handheld telephony device 111's end of the communication session in identifying an intermediary 130 that controls the corresponding target local telephony device(s) 101, and suitable for use by call server 105 in requesting authentication of one or more selected target local telephony devices 101.

At 706, a list of one or more target local telephony devices 101 can be displayed by or otherwise provided to the user of wireless handheld telephony device 111 through the use of any suitable output display screen 928 of wireless handheld telephony device 111, or other means. Such list may include any information suitable for use in identifying to the user the name, location, or distance to target local telephony device(s) 101, including for example some or all of the identifying information which may be included in the wireless signals, or any useful information based thereon. For example, such list may include the extension number, telephone name, or office, cubical, or other physical location information for some or all of target local telephony devices 101. In some embodiments, the list may also include range and/or directional information such as that described above. Directional information may be used to the provide the user with, for example, directions to a target local telephony device 101, the distance to one or more of target local telephony devices 101 and/or a map displaying the location of one or more of target local telephony devices 101.

For example, signals representing data useful for identifying available target local telephony devices 101 can be transmitted to an antenna 910, processed by receiver 908 of wireless handheld telephony device 111, and provided to a processor 900 as shown in FIG. 7. Processor 900 can interpret the received and processed signals to provide suitably-configured output signals to a display 928 controlled by the processor 900 in such form that a human user of the device 111 can interpret them as described herein.

A list of target local telephony devices 101 displayed on wireless handheld telephony device 111 may be sorted in a particular order such as, for example, according to a range or distance from wireless handheld telephony device 111 (e.g. from nearest to farthest). In some embodiments, the list may be sorted according to one or more preferences established by some criteria set, for example, by the user of wireless handheld telephony device 111 or by an administrator. For example, one or more target local telephony devices 101 can be preferred due to type of device and/or functionality offered, public/semi-public/private location or status, security (e.g. the level of encryption), or cost. In some instances, another wireless handheld telephony device may be preferred for battery or other quality reasons. In some embodiments, the list may include only a predetermined number of telephony devices. For example, the list may include only the five (or other convenient number) target local telephony devices 101 which are nearest to wireless handheld telephony device 111. Data useful in presenting the list on the display 928 can be temporarily or persistently stored in one or more memories 912 of wireless handheld telephony device 111, for later access and processing by processor 900 in response to input requests received from a user of the device.

In some embodiments, the list of target local telephony devices 101 provided at 706 may include all local telephony devices within effective communications range of wireless handheld telephony device 111. That is, they may include all devices within range of effective communications with respect to the sharing of identifying information at 704, or effective communications of other desired type or purpose. In other embodiments, the list of target local telephony devices 101 may include only those telephony devices which meet some predetermined criteria. For example, the list of target local telephony devices 101 may include only those telephony devices which are within a certain desired or required proximity of wireless handheld telephony device 111, such as within x number of meters (e.g. five meters) of wireless handheld telephony device 111 or on the same floor of a building as wireless handheld telephony device 111.

In some embodiments, certain telephony devices may be excluded from lists of target local telephony devices 101 even though they may match criteria for inclusion (e.g. they may be within five meters of wireless handheld telephony device 111). For example, telephony devices which are currently in use may be excluded from the list of target local telephony devices 101. Other telephony devices may, for example, be excluded from the list by the owner/user of the telephony device or by an administrator based on security, cost, etc. For example, an employee who may be vacating his desk, office, or cubicle temporarily may be able to indicate that they would prefer not to have any wireless conversations transferred to their office telephone. Similarly, an administrator could decide that only those telephones which are normally unused, such as those located in boardrooms or vacant offices, can be included in the list of target local telephony devices 101.

At 708, the user of wireless handheld telephony device 111 can select second telephony device 101 to which the user's end of the communications session will be transferred, for example, working from a list of target local telephony devices 101 provided at 706. Such selection may, for example, be made using any suitable input device 902 such as, for example, a keyboard, touch screen, mouse, trackball or the like, using any suitable input functionality, including, for example, special key commands, interaction with an interactive displayed list, etc. to provide suitably-configured input command signals to the responsible processor(s) 900 of the handheld device. The identity of selected target local telephony device 101 and any other useful information derived from the wireless signals at 704 (or otherwise) can be sent to wireless call server 105 which will coordinate the transfer with intermediary 130. This process will be discussed in greater detail in relation to FIG. 8.

In some embodiments, second telephony device 101 may be automatically selected by wireless handheld telephony device 111 based on one or more pre-established rules established by the user of the device 111 and/or any administrator(s) thereof. For example, wireless handheld telephony device 111 may always select the nearest target local telephony device 101, or the nearest such device meeting one or more predetermined criteria.

At 710, a human-interpretable signal may be emitted by second telephony device 101 once the end of the communications session previously assigned to wireless handheld telephony device 111 has been successfully transferred or when the transfer is ready to be completed. Such a signal may, for example, include a visual signal, such as illumination of a light located on the target device, and/or an audio signal, such as a ring tone, buzz, pre-selected melody, or other signal, which may for example have been previously selected or designated by the user of wireless handheld telephony device 111 or by an administrator of wireless handheld telephony device 111 and/or target local telephony device 101. An audio signal produced by the target device may be the same audio signal (e.g. ring tone) used in other circumstances (such as when wireless handheld telephony device 111 or target local telephony device 101 rings) or it may be unique to this process. The signal may indicate to the user that they may now continue their conversation on second telephony device 101. The signal may also help the user locate the device they had selected.

At 712, the user of wireless handheld telephony device 111 may unhook or otherwise pick up the target device by, for example, lifting the receiver or pushing a button on the target device to activate a speaker function. The user may at that time, if not already otherwise accomplished, cause transfer of the user's end of the communication session to target local telephony device 101 to be completed by, for example, activating an input command from wireless handheld telephony device 111. For example, wireless handheld telephony device 111 may, upon establishment of a communications session between selected target local telephony device 101 and the at least one third telephony device 121, display a confirmation message on an output display screen 928 of wireless handheld telephony device 111, and require confirmatory input from the user in order to complete transfer of the user's end of the communication session. It may be required or desirable that the at least one third telephony device 121 be placed on 'hold' or otherwise in a state of suspended communications pending the transfer.

Upon completion of the transfer, the user may continue the ongoing conversation (or other communication) with at least one third telephony device 121 using second telephony device 101. The portion of the communication session extending to wireless handheld telephony device 111 may be automatically terminated by, for example, intermediary 130. In other embodiments the user may 'hang up' or otherwise manually terminate any continuing call session processes in progress at wireless handheld telephony device 111.

Transfer of the user's end of the communication session may also include transfer of one or more telephony functions relating to the communication session.

Telephony functions that may be transferred in this manner may include telephony functions applicable to an on-going communication session such as, for example, call forwarding, call holding, call transfer, call muting, call logs, caller ID, etc. User preferences relevant to an ongoing call, including, for example preprogrammed soft button settings or volume level, may also be transferred. Service profiles associated with one or more users may be stored in the wireless call server 105 and may be associated with the wireless handheld telephony device 111. Transfer of telephony functions from the wireless handheld telephony device 111 to the second telephony device 101 may also transfer the profile association to the second telephony device 101, such that settings stored in the service profile are applied to the second telephony device 101. In some examples, one or more telephony functions that may be transferred to the second telephony device 101 may be limited or unable to be transferred, due to limitations in the second telephony device 101.

Although various telephony functions have been described as being transferred to form the wireless handheld telephony device 111 to the second telephony device 101, it should be understood that such transferal may also be a duplication of one or more telephony functions, such that such functions may be available both on the wireless handheld telephony device 111 and on the second telephony device 101, rather than a strict transferal of functions.

While the steps of method 700 are shown as occurring in a particular order, it will be appreciated by those skilled in the relevant arts that many of the process steps, and portions thereof, are interchangeable and may occur in different orders that that shown without materially affecting the end results of the method 700. It will further be appreciated by such persons that not all of such steps are required in order to accomplish the purposes disclosed herein, and that further steps may be optionally implemented.

Reference is now made to FIG. 9, which shows an example of command signal interchange operations of a system 10, 100 in transferring a wireless end of a communication session between a wireless handheld telephony device 111 and at least one third telephony device 121 to a second telephony device 101. In FIG. 9 voice data streams or connections are depicted using dashed lines and signals comprising command signal data are depicted using solid lines.

At 802 a communication session has previously been established between wireless handheld telephony device 111 and at least one third telephony device 121. In the example shown, the end of the communications session assigned to wireless handheld telephony device 111 is managed by a wireless call server 105. The communications session may be established and managed as, for example, disclosed herein, using SIP or other suitable protocols.

At 804 wireless handheld telephony device 111, for example upon coming within wireless communication range of one or more target local telephony devices 101, receives directly from each of such one or more target local telephony devices 101 signals representing data useful for establishing communications between the one or more target local telephony devices 101 and wireless call server 105. (That is, the signals are sent direct from target local telephony device(s) 101 to wireless handheld telephony device 111, without necessity for the signals to be routed through, for example, PBX 16.) As explained herein, the wireless signals may comprise identifying information and/or directional information for each target local telephony device 101. Such information may be formatted in accordance with, or compatible with any suitable protocol, such as those described herein, or may be formatted according to individual system preferences. Such signals may, for example, be received by one or more antenna(s) 910 of wireless handheld telephony device 111 and processed by receiver 908 for further processing by one or more processor(s) 900 of the device.

As explained herein, data provided by one or more target local telephony devices 101 useful by wireless handheld telephony devices 111 and/or their controlling call servers 105 for identifying such devices 101 can be provided on a push basis by target local telephony device(s) 101, or they can be pulled by a wireless handheld telephony device 111, either continuously, periodically, or in response to a query signal transmitted by wireless handheld telephony device 111 at the command of its user. For example, a user of a wireless handheld telephony device 111 walking into an office area containing one or more target local telephony devices 101 and desiring to transfer his/her end of an ongoing telephone call can activate a key-based command to cause the wireless device to push out a polling signal using, for example, an RFID-capable transmitter 906. The polling signal might be received and answered by one or more target local telephony devices 101 using suitably-configured RFID transponders.

In response to receipt and suitable display by wireless handheld telephony device 111 of signals from one or more target local telephony devices 101, the user of wireless handheld telephony device 111 can be provided an interactive opportunity to request transfer of the user's end of the ongoing call session to a selected one of target local telephony devices 101. For example, as described herein, when a user of wireless handheld telephony device 111 determines that he/she would like to transfer the ongoing communications session to a selected one of target local telephony devices 101, the user can enter input data indicating that the user would like to transfer the call to selected target local telephony device 101, using any one or more of input devices 902. For example, as described herein in connection with block/step 708 of FIG. 7, a list of one or more eligible target local telephony devices 101 can be displayed on an output screen of the user's wireless handheld telephony device 111; and a desired target phone may be selected by the user using interactive input means.

Upon input by the user of key-based or other command(s) indicating the user's selection of the desired target local telephony device 101, at 806 a processor 900 of wireless handheld telephony device 111 can cause a signal or signals representing a request to transfer the user's end of the call to such target local telephony device 101 to be sent to the responsible wireless call server 105. For example, at 806 the responsible wireless call server 105 can be provided by wireless handheld telephony device 111 with signals representing a request for authentication of at least selected target local telephony device 101. Optionally, authentication of multiple target local telephony devices 101 can be requested prior to selection by a user of wireless handheld telephony device 111.

At 808 wireless call server 105 responsible for controlling wireless handheld telephony device 111's end of the communications session can, using data provided by the wireless device (which might include data provided originally by the selected target local telephony devices 101), forward the request for authentication of the selected target local telephony devices 101 to a PBX or other intermediary 130 controlling or otherwise responsible for administering the selected target local telephony devices 101. Such data can, for example, be formatted in accordance with, or compatible with, any suitable protocols, as described herein. (Such server 16 can in various embodiments be incorporated in target local telephony devices 101 as a software and/or hardware component thereof.)

At 810 intermediary 130 responsible for controlling selected target local telephony device(s) 101 can, before, after, or while authorizing and/or authenticating the availability and suitability of selected target local telephony device(s) 101, send to the querying wireless call server 105 signals representing a request for authentication of wireless handheld telephony device 111 from which the request originated. This may be done, for example, in order to confirm that wireless handheld telephony device 111 is a valid end user (e.g. that the device is not using a false identity or "spoofing").

As will be appreciated by those skilled in the relevant arts, authentication of device(s) 111, 101, by their responsible servers 105, 16, 103 can be required for a wide variety of purposes, including security, accounting/billing, or control of signal traffic for bandwidth, capacity, or other reasons.

At 812 the responsible wireless server 105 can provide to the requesting intermediary 130 signals useful in establishing the authentication requested at 810.

At 814, in response to signals provided at 812, or independently, intermediary 130 can provide to the requesting wireless call server 105 signals useful by the wireless server 105 in establishing the authentication requested at 808.

If either authentication fails, the requesting server 105, 130 and/or device 101, 111 can be notified and a new selection, or other appropriate action, may be requested.

At 816 wireless call server 105 can provide to the requesting wireless handheld telephony device 111 signals representing a request for confirmation that a user of the device 111 wishes to transfer the end of the call session assigned to wireless handheld telephony device 111 to a selected target local telephony device 101. For example, wireless call server 105 can provide to wireless handheld telephony device 111 signals adapted to cause a processor 900 of the device 111 to display on an output display screen 928 of the device a request, which may be interactive, for the user of the device 111 to confirm his/her desire to complete the transfer.

In embodiments in which the request for confirmation presented to the user of wireless handheld telephony device 111 at 816 is implemented, at 820 the user can input command signals adapted to confirm or deny that the user wishes to complete transfer of the user's end of the call session to selected target local telephony device 101. In the event the user's intent to transfer the call is confirmed, further processing can be undertaken by wireless call server 105 and other system components to transfer the call session, as herein described. In the event the user declines to confirm a desire to complete transfer of the call, processing can be halted and the pre-existing call session between wireless handheld telephony device 111 and third telephony device 121 can be continued.

For example, at 820 a user of wireless handheld telephony device 111 can enter suitably-adapted keystrokes to cause processor 900 of wireless handheld telephony device 111 to provide to wireless call server 105 signals adapted for causing server 105 to complete transfer of the call session.

In many embodiments, as will be readily appreciated by those skilled in the relevant arts, it will be desirable in transferring wireless handheld telephony device 111's end of a call to a selected local telephony device to place third telephony device 121 in a 'hold' state, so that third telephony device 121's end of the existing call session (812) will not be dropped. Third telephony device 121 can be placed in such a hold state at any necessary or convenient point in the transfer process. As will be understood by those skilled in the relevant arts, such a necessary or convenient point may depend upon the protocol(s) and system architecture(s) used in creating and controlling the relevant call sessions. Thus, if third telephony device 121 has not already been placed in a hold state, at 822 wireless call server 105 can send to third telephony device 121 (or its corresponding server) a signal requesting that third telephony device 121's end of the call session be placed in a hold state.

At 824 wireless call server 105, having received a request for transfer of wireless handheld telephony device 111's end of the call session to selected target local telephony device 101 and optionally a confirmation of that request, can forward to intermediary 130 controlling selected target local telephony device 101a request for target local telephony device 101 to join the call session previously established between wireless handheld telephony device 111 and third telephony device 121, or otherwise accept transfer of wireless handheld telephony device 111's end of that call session.

As noted herein, it is desirable in some embodiments that a selected or selectable (i.e., target) local telephony device 101 be provided with means such as an audio and/or visual signal for identifying to a user of wireless handheld telephony device 111 the selected or selectable local telephony device 101, and optionally for indicating to such user that the selected or selectable (i.e., target) local telephony device 101 is ready to assume wireless handheld telephony device 111's end of the communications session. For example, at 826, in response to the signal provided by local call server 105 at 824, intermediary 130 can send to selected target local telephony device 101a signal adapted to cause selected target local telephony device 101 to provide for the user of wireless handheld telephony device 111a ringtone or other audio and/or visual signal, so that the user will pick up the receiver of selected target local telephony device 101, activate a speakerphone control, or otherwise activate the local telephony device in order to complete the transfer of wireless handheld telephony device 111's end of the communication session.

At 828, and optionally in response to the sending of the ringtone or other signal command by intermediary 130 at 826, the user of wireless handheld telephony device 111 (or other user) can pick up the receiver of selected target local telephony device 101, activate a speakerphone control, or otherwise initiate pick-up of wireless handheld telephony device 111's end of the communications session, and cause target local telephony device 101 to provide to intermediary 130 a signal indicating that selected target local telephony device 101 is ready to accept transfer of the communications session.

As shown at 830, upon activation of target local telephony device 101 at 828, upon confirmation at 820 of the user's desire to transfer the call, or at other suitable point, intermediary 130 can provide to wireless call server 105 signals confirming that selected target local telephony device 101 has initiated the call pick-up process and that wireless server 105 may terminate wireless handheld telephony device 111's end of the call session.

As shown at 834, wireless server 105, upon receipt of confirmation that selected target local telephony device 101 and/or intermediary 130 have initiated the process of picking up wireless handheld telephony device 111's end of the call session, can terminate wireless handheld telephony device 111's end of the call session. Suitable confirmation may be provided by the wireless server 105 to the wireless device.

As shown at 832, intermediary 130, upon confirmation or instruction that selected local device is ready to pick up wireless handheld telephony device 111's end of the call session, can provide to third telephony device 121 and/or a call server controlling third telephony device 121 signals configured for use by third telephony device 121 and/or its server in causing outgoing communications from third telephony device 121 to be routed to selected target local telephony device 101, and incoming communications from target local telephony device 101 to be routed to third telephony device 121

As shown at 836, and necessary or desirable signals useful for causing selected target local telephony device 101 to communicate with third telephony device 121 can be sent to selected target local telephony device 101, so that at 838 the transferred call session can continue, between selected local device 101 and third telephony device 121.

Further signals useful for processing communications between target local telephony device 101 and third telephony device 121 can be provided and processed according to any desired telephony protocol.

Figure 10A:
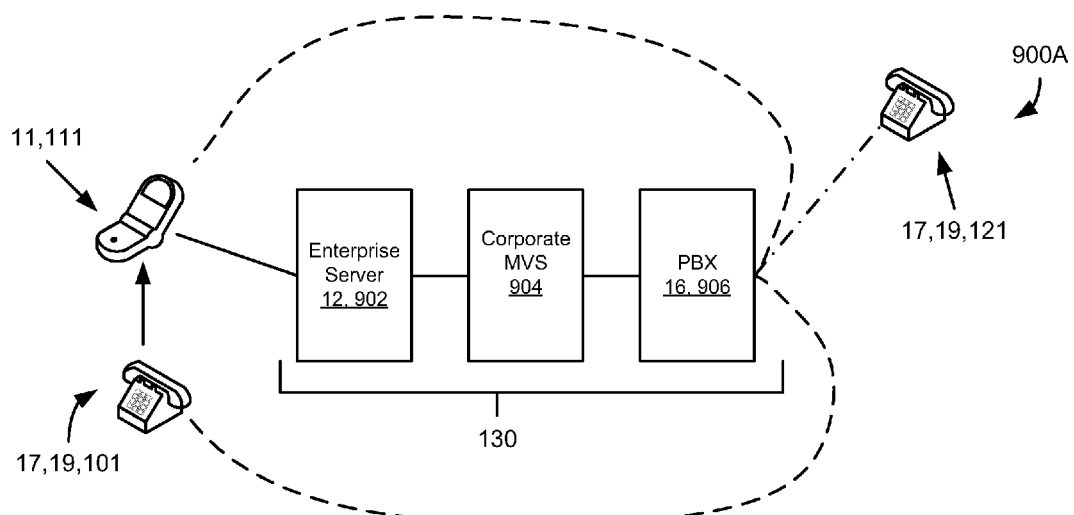
FIGS. 10A-10C are schematic diagrams of examples of systems for managing telephone and other communications in accordance with the disclosure herein.
Figure 10B:
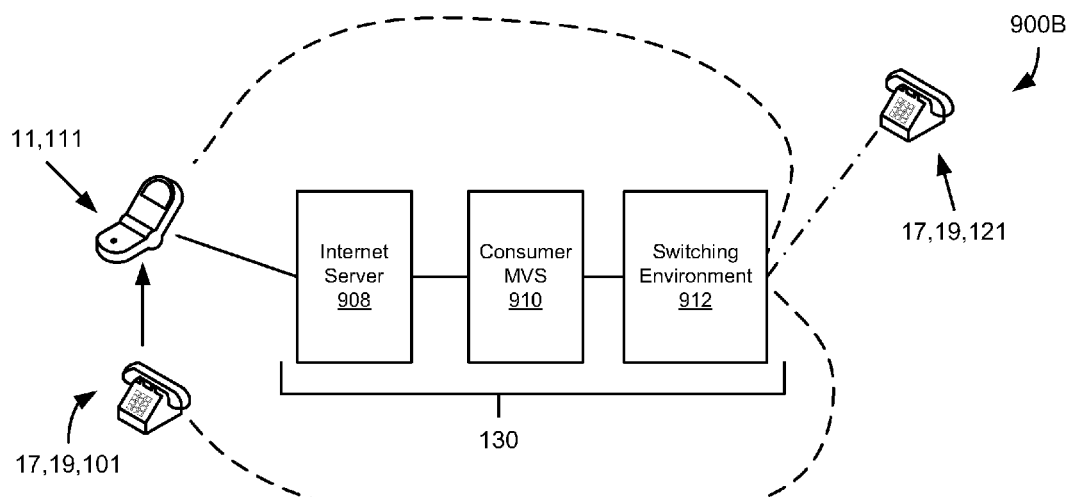
Figure 10C:
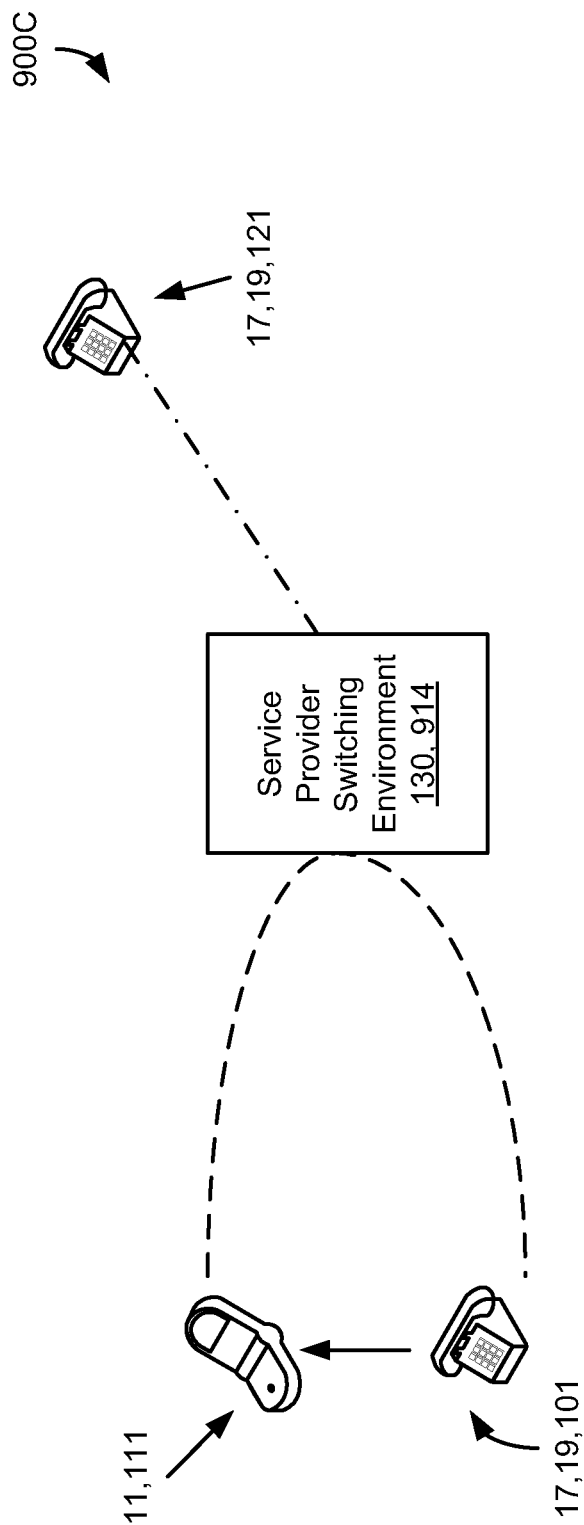

Reference will now be made to FIGS. 10A, 10B and 10C, which show, in block diagram form, three example systems 900A, 900B and 900C for transferring communication from a wireless handheld telephony device 111 to a second telephony device 101. In each of these diagrams, data connections are represented by solid lines where as voice connections are represented by dashed lines. Systems 900A, 900B and 900C of FIGS. 10A, 10B and 10C, respectively, may represent specific examples of system 100 of FIG. 6.

Referring first to FIG. 10A, an example system for transferring a communication is shown involving a corporate or enterprise environment. In this example, intermediary 130 comprises enterprise server 12, 902, corporate mobile voice server (MVS) 904, and PBX 16, 906. Wireless handheld telephony device 111 may be engaged in an ongoing conversation with at least one third telephony device 121 through PBX 906. In this embodiment, second telephony device 101 may be another corporate telephony device which is configured to communicate through PBX 906.

Wireless handheld telephony device 111 may receive wireless signals from second telephony device 101 as described above. Wireless handheld telephony device 111 may send identifying information received through the wireless signals to the enterprise serve 902 and corporate MVS 904. Using this information, corporate MVS 904 may instruct PBX 906 to transfer the communication session from wireless handheld telephony device 111 to second telephony device 101 such that the communication session continues between second telephony device 101 and at least one third telephony device 121 through PBX 906.

Referring next to FIG. 10B, an example system for transferring a communication is shown involving a consumer environment. In this embodiment, intermediary 130 comprises internet server 908, consumer MVS 910 and switching environment 912. Wireless handheld telephony device 111 may be engaged in an ongoing conversation with at least one third telephony device 121 through switching environment 912. In this embodiment, second telephony device 101 may be a public telephony device which is capable of communicating through switching environment 912.

Wireless handheld telephony device 111 may receive wireless signals from second telephony device 101 as described above. Wireless handheld telephony device 111 may send identifying information received through the wireless signals through a data connection to internet server 908 which is connected to consumer MVS 910. Switching environment 912 may then be directed to transfer the ongoing communication from wireless handheld telephony device 111 to second telephony device 101 such that the communication session continues between second telephony device 101 and at least one third telephony device 121 through switching environment 912. In some embodiments, where second telephony device 101 is configured for voice communications over the internet (such as a Skype-enabled device), the communication session may be transferred via switching environment 912 over the internet using IP addressing. In other embodiments, the communication session may be transferred via switching environment 912 over, for example a PSTN such as PSTN 40 of FIG. 1.

Finally, referring to FIG. 10C, an example system for transferring a communication is shown involving a consumer environment where a data connection is not available. In this embodiment, intermediary 130 comprises a service provider switching environment 914. Wireless handheld telephony device 111 may be engaged in an ongoing conversation with at least one third telephony device 121 through service provider switching environment 914. In this embodiment, second telephony device 101 may be a public telephony device which is capable of communicating through service provider switching environment 914.

Wireless handheld telephony device 111 may receive wireless signals from a second telephony device 101 as described above. Once the identity of second telephony device 101 to which communication will be transferred has been established, wireless handheld telephony device 111 may provide this information to the service provider switching environment 914. This may be done using, for example, in-band or sideband DTMF, data signaling via a carrier APN or simple SMS back to the SPSE or using any other available protocol. Service provider switching environment 914 may transfer the ongoing communication from wireless handheld telephony device 111 to second telephony device 101 such that the communication session continues between second telephony device 101 and at least one third telephony device 121 through service provider switching environment 914.

While the this disclosure and its examples have been described and illustrated in connection with specific, presently-preferred embodiments, many variations and modifications may be made without departing from the spirit and scope of the disclosure. The disclosure is therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the claims is to be defined solely by the appended claims, giving due consideration to the doctrine of equivalents and related doctrines.

What is claimed is:

1. A wireless handheld telephony device comprising at least one wireless signal receiver, at least one wireless signal transmitter, at least one data processor, and non-transient media readable by the at least one data processor comprising coded program instructions adapted for enabling the wireless handheld telephony device to cause transfer to a target telephony device of an end of a communications session previously established between the wireless handheld telephony device and at least one third telephony device by:

while the previously-established communications session between the wireless handheld telephony device and the at least one third telephony device is maintained, receiving directly from one or more target local telephony devices one or more wireless signals representing data useful for establishing communications between the one or more target local telephony devices and a call server managing the end of the previously-established communications session associated with the wireless handheld telephony device;

using the wireless signals received directly from the one or more target local telephony devices, displaying by the wireless handheld telephony device a list identifying the one or more target local telephony devices that are within a predefined geographic area;

upon selection of a target local telephony device by a user of the wireless handheld telephony device, using the wireless signals received directly from the one or more target local telephony devices to transmit instructions to the call server, including an identity of the selected target local telephony device, to establish a communications session between the selected one of the one or more target local telephony devices and the at least one third telephony device; and upon receiving a confirmation that the selected target local telephony device has been picked up, establishing, by the call server, a communications session between the selected target local telephony device and the at least one third telephony device, and terminating the previously-established communications session between the wireless handheld telephony device and the at least one third telephony device;

wherein transmitting instructions to the call server to establish the communications session between the selected target local telephony device and the at least one third telephony device includes transmitting instructions to apply a service profile defined by the user of the wireless handheld telephony device, including at least one telephony function applicable to the previously established communications session between the wireless handheld telephony device and the at least one third telephony device to the communication session between the selected target local telephony device and the at least one third telephony device.

2. The wireless handheld telephony device of claim 1, wherein the wireless signals are pulled from the one or more target local telephony devices by the wireless handheld telephony device.

3. The wireless handheld telephony device of claim 2, wherein the one or more target local telephony devices comprise an RFID transponder and the wireless handheld telephony device comprises an RFID transmitter adapted to pull the wireless signals from the transponder of the one or more target local telephony devices.

4. The wireless handheld telephony device of claim 1, wherein the wireless signals include signals representing one or more of an extension number, a name, an office location and a relative physical location for each of the one or more target local telephony devices.

5. The wireless handheld telephony device of claim 1, further comprising at least one display, wherein the coded program instructions are adapted for causing the display to display a list identifying the one or more target local telephony devices.

6. The wireless handheld telephony device of claim 5, wherein the coded program instructions are adapted for causing the display to display information useful in physically locating the one or more target local telephony devices.

7. The wireless handheld telephony device of claim 6, wherein the information useful in physically locating the one or more target local telephony devices comprises at least one of a map and textual information useful for locating the one or more target local telephony devices.

8. The wireless handheld telephony device of claim 5, wherein the list comprises all local telephony devices within a predetermined range of the wireless handheld telephony device.

9. The wireless handheld telephony device of claim 5, wherein the list comprises local telephony devices within range of the wireless handheld telephony device which are in an idle state.

10. The wireless handheld telephony device of claim 5, wherein a predetermined number of local telephony devices are listed according to:
   distance from the wireless handheld telephony device;
   one or more previously determined criteria established by an administrator of the wireless handheld telephony device; and
   one or more previously determined criteria established by a user associated with the wireless handheld telephony device.

11. A method of transferring to a target telephony device an end of a communications session previously established between a wireless handheld telephony device and at least one third telephony device, the method comprising:
   while maintaining the previously-established communications session between the wireless handheld telephony device and the at least one third telephony device, receiving directly from one or more target local telephony devices one or more wireless signals representing data useful for establishing communications between the one or more target local telephony devices and a call server managing the end of the previously-established communications session associated with the wireless handheld telephony device;
   using the wireless signals received directly from the one or more target local telephony devices, displaying by the wireless handheld telephony device a list identifying the one or more target local telephony devices that are within a predefined geographic area;
   upon selection of a target local telephony device by a user of the wireless handheld telephony device, using the wireless signals received directly from the one or more target local telephony devices to transmit instructions to the call server, including an identity of the selected target local telephony device, to establish a communications session between the selected one of the at least one target local telephony devices and the at least one third telephony device; and
   upon receiving a confirmation that the selected target local telephony device has been picked up, establishing, by the call server, a communications session between the selected target local telephony device and the at least one third telephony device, and terminating the previously-established communications session between the wireless handheld telephony device and the at least one third telephony device;
   wherein transmitting instructions to the call server to establish the communications session between the selected target local telephony device and the at least one third telephony device includes transmitting instructions to apply a service profile defined by the user of the wireless handheld telephony device, including at least one telephony function applicable to the previously established communications session between the wireless handheld telephony device and the at least one third telephony device to the communication session between the selected target local telephony device and the at least one third telephony device.

12. The method of claim 11, wherein the wireless signals representing data useful for establishing communications between the one or more target local telephony devices and a call server include signals representing one or more of an extension number, a name, an office location and a relative physical location for each of the one or more target local telephony devices.

13. The method of claim 11, further comprising providing to the wireless handheld telephony device signals for causing the wireless handheld telephony device to display a list identifying the one or more target local telephony devices.

14. The method of claim 11, further comprising providing to the wireless handheld telephony device signals representing information useful in physically locating the one or more target local telephony devices.

15. The method of claim 14, wherein the information useful in physically locating the one or more target local telephony devices comprises at least one of a map and textual information useful for locating the one or more target local telephony devices.

16. The method of claim 13, wherein the list comprises all local telephony devices within a predetermined range of the wireless handheld telephony device.

17. The method of claim 13, wherein the list comprises local telephony devices within range of the wireless handheld telephony device which are in an idle state.

18. The method of claim 13, wherein a predetermined number of local telephony devices are listed according to: distance from the wireless handheld telephony device; one or more previously determined criteria established by an administrator of the wireless handheld telephony device; and one or more previously determined criteria established by a user associated with the wireless handheld telephony device.

19. The wireless handheld telephony device of claim 1, wherein the at least one telephony function includes at least one of a calling feature and an ongoing call preference.

20. The method of claim 11, wherein the at least one telephony function includes at least one of a calling feature and an ongoing call preference.

* * * * *